(12) United States Patent
Dubey

(10) Patent No.: US 12,118,640 B2
(45) Date of Patent: *Oct. 15, 2024

(54) HARDWARE ACCELERATOR FOR HISTOGRAM OF ORIENTED GRADIENTS COMPUTATION

(71) Applicant: Texas Instruments Incorporated, Dallas, TX (US)

(72) Inventor: Aishwarya Dubey, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 416 days.

This patent is subject to a terminal disclaimer.

(21) Appl. No.: 17/314,177

(22) Filed: May 7, 2021

(65) Prior Publication Data

US 2021/0264612 A1  Aug. 26, 2021

Related U.S. Application Data

(63) Continuation of application No. 15/954,590, filed on Apr. 16, 2018, now Pat. No. 11,004,205.

(Continued)

(51) Int. Cl.
*G06K 9/48* (2006.01)
*G06T 1/20* (2006.01)
(Continued)

(52) U.S. Cl.
CPC .............. *G06T 1/20* (2013.01); *G06T 7/10* (2017.01); *G06T 7/13* (2017.01); *G06V 10/44* (2022.01);
(Continued)

(58) Field of Classification Search
CPC ........ G06V 10/40; G06V 10/44; G06V 10/46; G06V 10/464; G06V 10/473; G06V 10/48;
(Continued)

(56) References Cited

U.S. PATENT DOCUMENTS

| 6,408,109 B1 * | 6/2002 | Silver | ................ G06T 7/12 382/199 |
| 6,690,842 B1 * | 2/2004 | Silver | ................ G06T 7/12 382/199 |

(Continued)

FOREIGN PATENT DOCUMENTS

| CN | 1162795 A | 10/1997 |
| JP | 2015184908 A | 10/2015 |

OTHER PUBLICATIONS

Seung Eun Lee, et al., "Accelerating Histograms of Oriented Gradients Descriptor Extraction for Pedestrian Recognition", Computers and Electrical Engineering, vol. 39, Issue 4, May 2013, pp. 1043-1048, available online Apr. 28, 2013.

(Continued)

*Primary Examiner* — Eric Rush
(74) *Attorney, Agent, or Firm* — Michael T. Gabrik; Frank D. Cimino

(57) ABSTRACT

A hardware accelerator for histogram of oriented gradients computation is provided that includes a gradient computation component configured to compute gradients $G_x$ and $G_y$ of a pixel, a bin identification component configured to determine a bin id of an angular bin for the pixel based on a plurality of representative orientation angles, $G_x$, and signs of $G_x$ and $G_y$, and a magnitude component configured to determine a magnitude of the gradients $G_{mag}$ based on the plurality of representative orientation angles and the bin id.

20 Claims, 4 Drawing Sheets

Related U.S. Application Data

(60) Provisional application No. 62/486,557, filed on Apr. 18, 2017.

(51) Int. Cl.
| | |
|---|---|
| *G06T 7/10* | (2017.01) |
| *G06T 7/13* | (2017.01) |
| *G06V 10/44* | (2022.01) |
| *G06V 10/46* | (2022.01) |
| *G06V 10/50* | (2022.01) |
| *G06V 10/94* | (2022.01) |

(52) U.S. Cl.
CPC ............ *G06V 10/473* (2022.01); *G06V 10/50* (2022.01); *G06V 10/94* (2022.01); *G06V 10/955* (2022.01); *G06F 2218/08* (2023.01); *G06T 2200/28* (2013.01)

(58) Field of Classification Search
CPC ...... G06V 10/50; G06V 10/507; G06V 10/94; G06V 10/955; G06F 18/21; G06F 18/213; G06F 2218/08; G06T 1/20; G06T 7/10; G06T 7/12; G06T 7/13; G06T 7/41; G06T 2200/28; G06T 2207/20021
USPC ....... 382/100, 103, 159, 168, 170, 181, 190, 382/195, 197, 199, 205, 224; 708/200, 708/201, 276, 440
See application file for complete search history.

(56) References Cited

U.S. PATENT DOCUMENTS

| | | | |
|---|---|---|---|
| 7,088,862 B1 | 8/2006 | Silver et al. | |
| 8,510,354 B1 | 8/2013 | Langhammer | |
| 8,774,508 B2 * | 7/2014 | Anbai ................. | G06V 10/462 382/195 |
| 9,639,777 B1 | 5/2017 | Moloney et al. | |
| 2007/0098222 A1 | 5/2007 | Porter et al. | |
| 2008/0317283 A1 | 12/2008 | Zhang et al. | |
| 2009/0094306 A1 | 4/2009 | Krishnakalin et al. | |
| 2010/0200660 A1 * | 8/2010 | Moed ....................... | G06K 7/14 235/470 |
| 2010/0296706 A1 | 11/2010 | Kaneda et al. | |
| 2012/0134586 A1 * | 5/2012 | Pajaniradja ............. | G06T 7/269 382/170 |
| 2014/0118592 A1 | 5/2014 | Yoon et al. | |
| 2014/0270479 A1 * | 9/2014 | Berestov ................... | G06T 7/13 382/154 |
| 2015/0269449 A1 | 9/2015 | Kosaki | |
| 2016/0026898 A1 | 1/2016 | Abad et al. | |
| 2016/0203384 A1 | 7/2016 | Richmond et al. | |
| 2016/0371844 A1 | 12/2016 | Friman | |
| 2017/0091575 A1 * | 3/2017 | Lee ........................ | G06V 10/50 |
| 2017/0098135 A1 | 4/2017 | Munteanu et al. | |
| 2017/0256058 A1 | 9/2017 | Seo et al. | |
| 2017/0358086 A1 | 12/2017 | Dinu et al. | |
| 2018/0322361 A1 | 11/2018 | Yamada et al. | |
| 2019/0325252 A1 | 10/2019 | Griffin et al. | |

OTHER PUBLICATIONS

Sebastian Bauer, et al., "FPGA Implementation of a HOG-based Pedestrian Recognition System", Multi Project Chip Group (MPC) Workshop, Jul. 2009, pp. 1-10.

Kosuke Mizuno, et al., "An FPGA Implementation of a HOG-based Object Detection Processor", IPSJ Transactions on System LSI Design Methodology, vol. 6, Feb. 2013, pp. 42-51.

International Search report for PCT/US2018/027959 mailed Jun. 28, 2018.

Extended European Search Report for 18787940.8 mailed Mar. 30, 2020.

Chen, et al.; "An Efficient Hardware Implementation of HOG Feature Extraction for Human Detection"; IEEE Transactions on Intelligent Transportation Systems, vol. 15. No. 2; Apr. 2014; pp. 656-662.

Aiying Guo, et al.; "CORDIC-based parameters-fusion HOG IP for extracting feature"; IEICE Electronics Express, vol. 13, No. 19, Sep. 2016; pp. 1-11.

Office Action in Japanese Patent Application No. 2019-556907, dated Apr. 20, 2022, 5 pages.

* cited by examiner

HARDWARE ACCELERATOR FOR HISTOGRAM OF ORIENTED GRADIENTS COMPUTATION

CROSS-REFERENCE TO RELATED APPLICATIONS

This application is a continuation of U.S. patent application Ser. No. 15/954,590, filed Apr. 16, 2018, which claims the benefit of U.S. Provisional Patent Application No. 62/486,557, filed Apr. 18, 2017, each of which is incorporated herein by reference in its entirety.

BACKGROUND

For many embedded computer vision applications, such as, for example, pedestrian recognition in advanced driver assistance systems (ADAS), fast weighted gradient (angular) calculation is required. For example, canny and other angular edge and feature detection algorithms require calculation of oriented gradients on image pixels to help ensure accurate, thin edges. In another example, histogram of oriented gradients (HOG) features are used by many vision algorithms for general object detection which requires calculation of oriented gradients for each pixel in multiple windows of an image and calculation of the histogram distribution of the oriented gradients for each window.

Oriented gradient and histogram calculations are computationally expensive. For example, for a HOG algorithm, the orientation angle θ of the x and y gradients as well as the magnitude of the gradients for a pixel are given by $$\theta(x,y) = \tan^{-1}(G_y/G_x)$$

$$G_{mag} = \sqrt{G_x^2 + G_y^2}$$

where $G_x$ and $G_y$ are the respective horizontal and vertical gradients. The orientation angle θ and $G_{mag}$ are calculated for each pixel in multiple overlapping detection windows in an image. Performing such calculations in real time for large images in an embedded computer vision application can consume most if not all the computational power of processors currently used in embedded devices.

SUMMARY

Examples of the present disclosure relate to methods and apparatus for acceleration of histogram of oriented gradients computation. In one aspect, a hardware accelerator for histogram of oriented gradients computation is provided that includes a gradient computation component configured to compute gradients $G_x$ and $G_y$ of a pixel, a bin identification component configured to determine a bin id of an angular bin for the pixel based on a plurality of representative orientation angles, $G_x$, and signs of $G_x$ and $G_y$, and a magnitude component configured to determine a magnitude of the gradients $G_{mag}$ based on the plurality of representative orientation angles and the bin id.

In one aspect, a method for histogram of oriented gradients computation in a hardware accelerator is provided that includes computing gradients $G_x$ and $G_y$ of a pixel in a gradient computation component of the hardware accelerator, determining a bin id of an angular bin for the pixel in a bin identification component of the hardware accelerator, wherein the bind id is determined based on a plurality of representative orientation angles, $G_x$, and signs of $G_x$ and $G_y$, and determining a magnitude of the gradients $G_{mag}$ in a magnitude component of the hardware accelerator, wherein the magnitude is determined based on the plurality of representative orientation angles and the bin id.

In one aspect, a system on a chip (SOC) is provided that includes a hardware accelerator for histogram of oriented gradients (HOG) computation, the hardware accelerator configurable to generate a bin id and a gradient magnitude for each pixel in an image, a memory coupled to the hardware accelerator to store the bin ids and gradient magnitudes, a HOG generator coupled to the memory, wherein the HOG generator is configurable to generate HOG descriptors using the bin ids and gradient magnitudes generated by the hardware accelerator, and a processor coupled to the memory and the hardware accelerator, the processor operable to execute a vision processing application programmed to detect a plurality of objects, the vision processing application comprising software instructions that configure the hardware accelerator to generate the bin ids and gradient magnitudes and that configure the HOG generator to generate HOG descriptors for each object of the plurality objects using the bin ids and gradient magnitudes.

In one aspect, a method for using a hardware accelerator for histogram of oriented gradients (HOG) computation is provided that includes determining a bin id and a gradient magnitude for each pixel in an image by the hardware accelerator, and computing HOG descriptors for classification of a plurality of types of objects using the bin ids and gradient magnitude.

DETAILED DESCRIPTION

Figure 1:
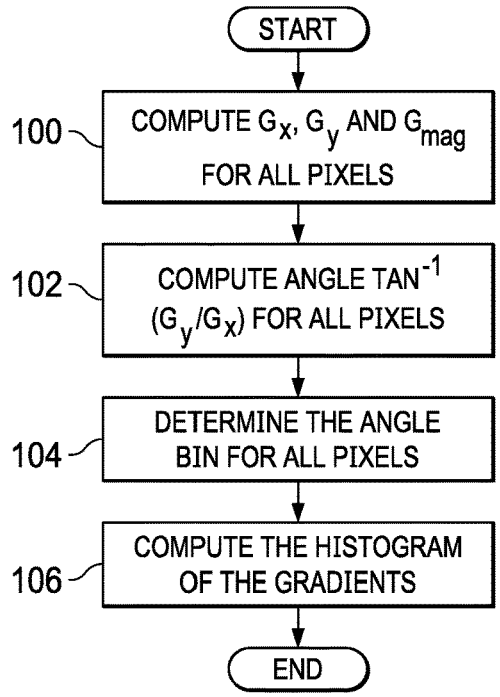
FIG. 1 is a flow diagram of a method for calculating a histogram of oriented gradients (HOG)

Specific examples of the disclosure will now be described in detail with reference to the accompanying figures. Like elements in the various figures are denoted by like reference numerals for consistency.

FIG. 1 is a flow diagram of a method for calculating a histogram of oriented gradients. The method is explained with reference to the example of FIG. 2, which is representative of the HOG computation performed for pedestrian recognition. Other object recognition algorithms perform similar HOG computations for different window sizes. In general, HOG is used as a feature set for object recognition tasks. The basic idea is that local object appearance and shape is characterized by the distribution of local intensity gradients or edge directions, without precise knowledge of the corresponding gradient or edge positions.

Figure 2:
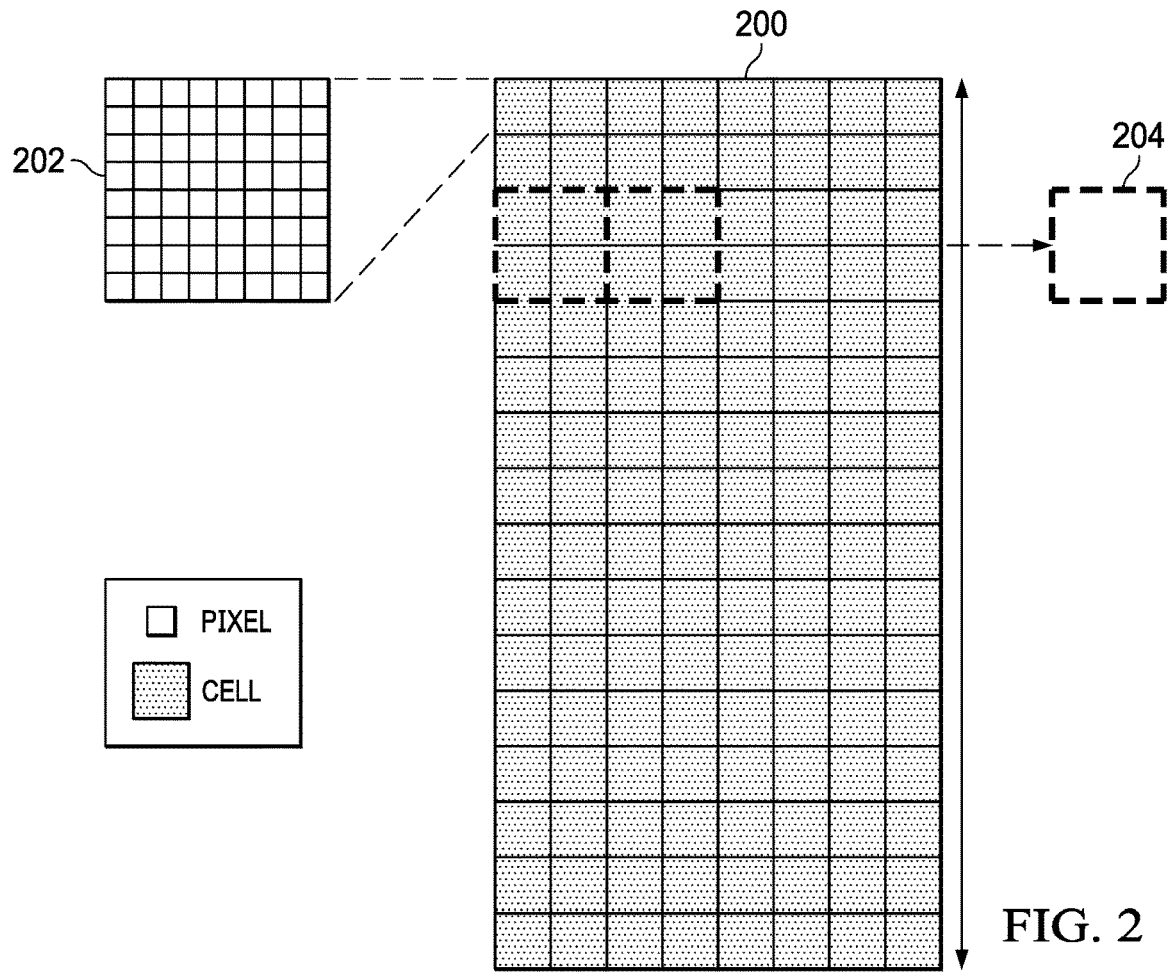
FIG. 2 is an example of HOG computation for pedestrian recognition.

In the example of FIG. 2, to determine initial pedestrian location, a sliding window approach is used in which a detection window 200 is shifted over an image. For each detection window, a HOG feature set is generated from the pixels in the window and evaluated for the presence of a pedestrian. In this example, the detection window 200 is assumed to be 64×128 pixels.

Referring now to FIG. 1, the gradients $G_x$ and $G_y$ of each pixel in the detection window 200 are computed 100 along with the magnitude $G_{mag}$. The gradients of a pixel, also referred to as gradient vectors or image gradients, are a measure of the change in pixel values along the x-direction and y-direction around a pixel. In general, the gradients for a pixel are computed by convolving filters centered on the pixel with pixels in the image covered by the filters. Filter sizes and configurations may vary. The magnitude $G_{mag}$ is computed as per $$G_{mag}=\sqrt{G_x^2+G_y^2}$$

The orientation angle θ of the gradients is also computed 102 for each pixel. The orientation angle θ for a pixel is computed as per $$\theta=\tan^{-1}(G_y/G_x).$$

The orientation angles are then used to determine 104 an angle bin for each pixel. To determine the bins, the detection window 200 is divided into local spatial regions referred to as cells. In the example of FIG. 2, a cell 202 is 8×8 pixels. The sixty-four pixels in each cell are discretized into angular bins according to their orientation angles. The angular bins are evenly spread over 0 to 180 degrees or 0 to 360 degrees depending on whether the gradients are signed or unsigned. For example, for signed gradients, there may be nine angular bins evenly spread over 0 to 180 degrees. The orientation angle θ for a pixel determines the particular bin for the pixel.

A histogram of the oriented gradients is then computed 106 for each cell in the detection window 200 based on the bins and the magnitudes of the pixels in the cell. The gradient magnitudes of the pixels assigned to a bin determine the height of the bar in the histogram corresponding to the bin. That is, the height of a bar in the histogram is a function of the gradient magnitudes of the pixels assigned to the corresponding bins. For example, the height may be the sum or a weighted sum of the magnitudes of the pixels.

Gradient strengths vary over a wide range due to factors such as shadows, local variations in illumination, and foreground/background contrast. Therefore, local contrast normalization is needed. For this purpose, groups of adjacent cells are considered as spatial regions referred to as blocks. In the example of FIG. 2, a block 204 is a group of 2×2 adjacent cells. Each block is represented by a concatenation of the corresponding four cell histograms that is normalized using, for example, the L2 norm. The final HOG descriptor for the detection window 200 is represented by a concatenation of the normalized block responses.

As previously mentioned, computing histograms of oriented gradients in real time for large images in an embedded computer vision application can consume most if not all of the computational power of processors currently used in embedded devices. Examples of the disclosure provide a hardware accelerator for HOG computation. More specifically, examples a hardware accelerator are provided that accelerate the determination of the bin identifiers and gradient magnitudes of pixels that are needed for computing histograms of oriented gradients.

Figure 3:
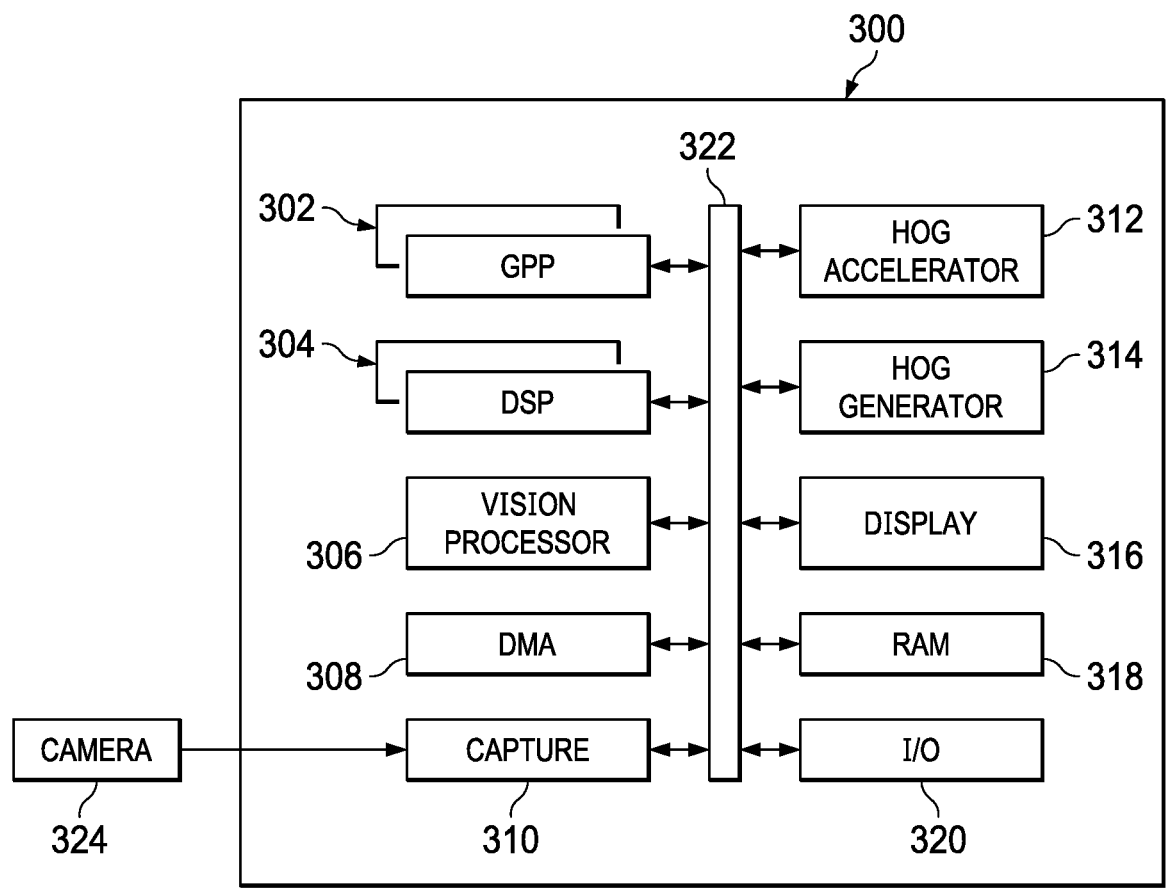
FIG. 3 is a high level block diagram of an example multiprocessor system-on-a-chip (SOC)

FIG. 3 is a high level block diagram of an example multiprocessor system-on-a-chip (SOC) 300 configured to support computer vision processing. The SOC 300 includes dual general purpose processors (GPP) 302, dual digital signal processors (DSP) 304, a vision processor 306, a HOG generator 314, and a HOG accelerator 312 coupled via a high speed interconnect 322.

The vision processor 306 is a vector processor tuned for various computer vision and other signal processing tasks such as features from acceleration test (FAST) feature computation, deep neural convolutional network computations, etc. The GPP 302 hosts the operating system and provides overall control of the operation of the SOC 300 including scheduling of the processing performed by the HOG accelerator 312. The DSP 304 provides support for computer vision processing such as object detection and classification, which may use the output of the HOG generator 314.

The SOC 300 further includes a direct memory access (DMA) component 308, a camera capture component 310 coupled to the external camera 324, a display management component 316, on-chip random access (RAM) memory 318, e.g., a computer readable medium, and various input/output (I/O) peripherals 320 all coupled to the processors, the HOG accelerator 312, and the HOG generator 314 via the interconnect 322. The camera 324 may be coupled to the SOC 300 via an analog connection, an Ethernet cable, a low-voltage differential signaling (LVDS) cable, or other suitable wired or wireless connection.

Figure 4:
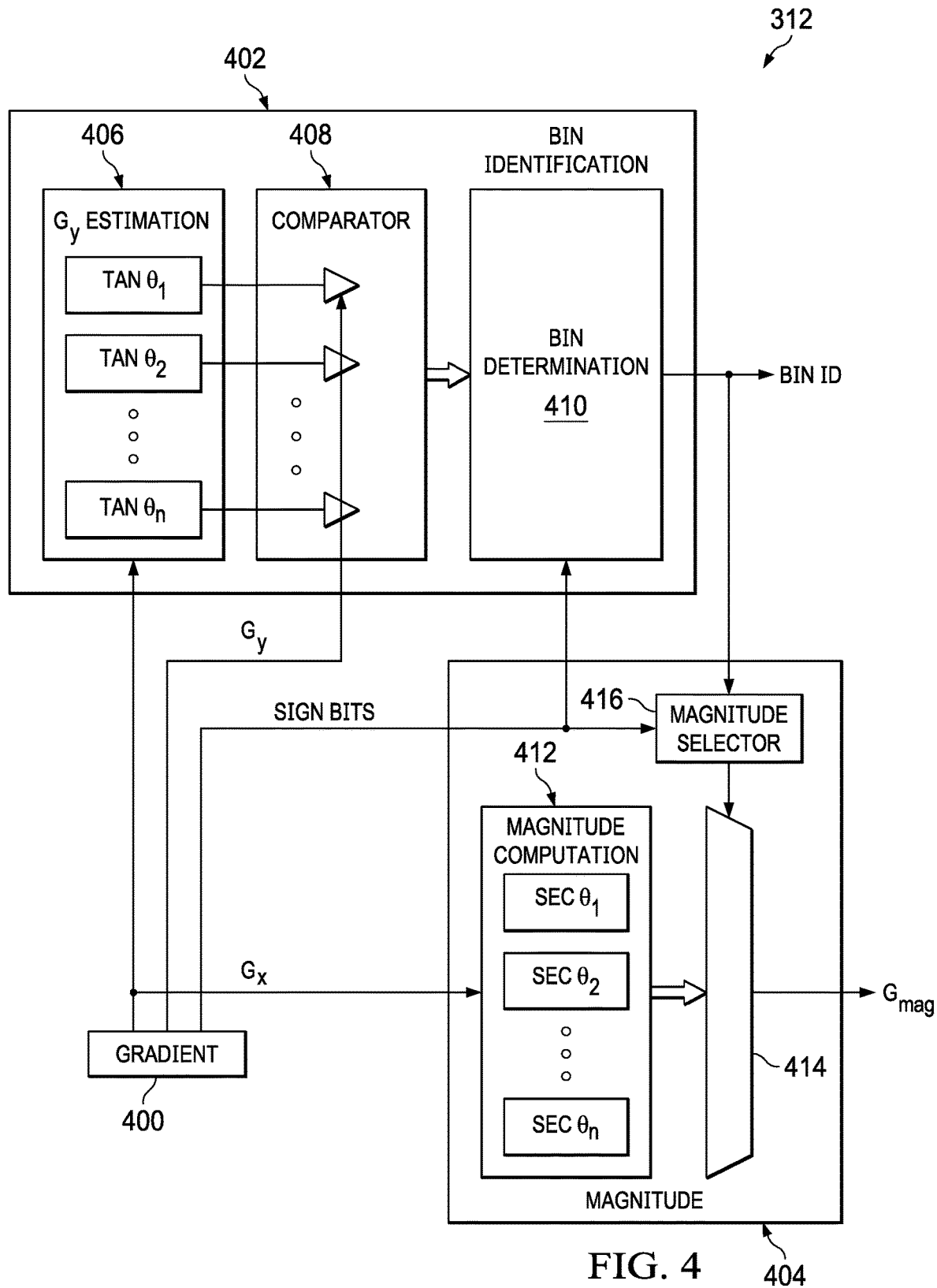
FIG. 4 is high level block diagram of an example HOG accelerator of the SOC of FIG. 3.

As is explained in more detail in reference to FIG. 4, the HOG accelerator 312 includes functionality to determine bin identifiers and gradient magnitudes of pixels in images captured by the camera 324. A computer vision application executing on the DSP 304 configures the HOG accelerator 312 to generate bin identifiers and gradient magnitudes of pixels in an image in accordance with parameters specified by the application. For example, the application can configure parameters of the HOG accelerator 312 such as the number of bins in a cell histogram and representative orientation angles for each bin. Representative orientation angles and configuration of the HOG accelerator 312 are described in reference to FIG. 4. The HOG accelerator 312 determines a bin identifier and a gradient magnitude for each pixel in the image in accordance with the configured parameters and stores this data in the RAM 318 for use by the HOG generator 314.

The HOG generator 314 includes functionality to generate HOG descriptors for detection windows using the bin identifiers and gradient magnitude generated by the HOG accelerator 312. More specifically, the HOG generator 314 is configurable to generate HOG descriptors using the data generated by the HOG accelerator 312 according to what type of object the computer vision application is looking for in the image. For example, for pedestrian detection, the application can configure parameters of the HOG generator 314 such as a detection window size, the portion of the image to use for generating HOG descriptors (which may be a subset of the image or the entire image), cell size, and block size. For vehicle detection, the application can configure the parameters differently.

The HOG generator 314 uses the stored data to generate HOG descriptors for detection windows in the specified image portion according to the specified detection window size, cell size, and block size. More specifically, the HOG generator 314 implements a sliding window approach in which a detection window of the specified size is shifted over the data generated by the HOG accelerator 312 corresponding to the specified portion of the image. For each detection window, the HOG generator 312 generates a HOG descriptor. As previously mentioned, generation of a HOG descriptor for a detection window includes generating HOGs for cells, normalizing the HOGs of blocks of cells, and concatenating the resulting normalized HOGs to form a HOG descriptor for the detection window. Note that the bin ids and magnitudes can be generated one time for an image by the HOG accelerator 312 and used multiple times by the HOG generator 314 to generate HOG descriptors for detection of differing object types as configured by the vision processing application.

FIG. 4 is a block diagram of an example HOG accelerator 312. The architecture of the HOG accelerator 312 is based on the following observations. As previously mentioned, the gradient magnitude $G_{mag}$ of a pixel can be computed as per $$G_{mag}=\sqrt{G_x^2+G_y^2}$$

where $G_x$ and $G_y$ are, respectively, the gradient of the pixel in the x direction and the gradient of the pixel in the y direction. The gradient magnitude $G_{mag}$ can alternatively be computed as per $$G_{mag}=G_x*\sec(\theta)$$

where $\sec(\theta)=1/\cos(\theta)$ and $\theta$ is the orientation angle of the gradients. Therefore, two fundamental equations for computing gradient magnitude and $\tan^{-1}(G_y/G_x)$ can be represented as $$G_{mag}=G_x*\sec(\theta)$$

$$G_y=G_x*\tan(\theta).$$

In addition, as illustrated in Table 1, the quadrant of the orientation angle $\theta$ can be determined based on the signs of the gradients $G_x$ and $G_y$. Therefore, $\tan^{-1}(G_y/G_x)$ does not need to be computed for all quadrants. Instead, the orientation angle computations can be performed for one quadrant, e.g., 0 to 90 degrees, and the sign bits can be used to determine the actual quadrant of the orientation angle $\theta$.

TABLE 1

| Sign of $G_x$ | Sign of $G_y$ | Angle quadrant (degrees) |
|---|---|---|
| + (0 to 128) | + (0 to 128) | 0-90 |
| − (−128 to 0) | + (0 to 128) | 90-180 |
| − (−128 to 0) | − (−128 to 0) | 180-270 |
| + (0 to 128) | − (−128 to 0) | 270-360 |

The HOG accelerator 312 includes a gradient computation component 400, a bin identification component 402, and a gradient magnitude computation component 404. The gradient computation component 400 computes the x and y gradients, $G_x$ and $G_y$, for a pixel. Any suitable technique for computing the gradients can be used. In some examples, the gradients are computed as per $$G_x=[1\ 0\ -1]*I$$

$$G_y=[1\ 0\ -1]T*I$$

where I is the image containing the pixel and * is convolution. Outputs of the gradient computation component 400 include $G_x$, $G_y$, and the signs of the gradients.

The bin identification component 402 receives the computed gradients $G_x$ and $G_y$ from the gradient computation component 400 as well as the sign bits for the gradients and uses these inputs to identify the angular bin for the pixel. To identify the angular bin for a pixel, the bin identification component 402 determines which of the representative orientation angles, which are required to be between 0 and 90 degrees, is closest to the actual orientation angle of the gradients and then uses this information and the sign bits to identify the angular bin of the pixel. As previously mentioned, a vision processing application can specify the number of bins in a histogram and a representative orientation angle for bin in the first quadrant, i.e., the quadrant between 0 and 90 degrees.

The bin identification component 402 includes a $G_y$ estimation component 406, a comparator component 408, and a bin determination component 410. The $G_y$ estimation component 406 is configured to compute estimated values of $G_y$ for multiple representative orientation angles. That is, the $G_y$ estimation component 406 is configured to compute $$G_y=G_x*\tan(\theta)$$

for each specified representative orientation angle. The computations are performed in parallel and the number of representative orientation angles that can be specified is implementation dependent. An application can specify values for any number of angles up to the maximum number supported by the $G_y$ estimation component 406. In some examples, circuitry to support parallel computations for a maximum of 45 angles is present. As previously mentioned, each specified angle value corresponds to a bin in the first quadrant. The outputs of the $G_y$ estimation component 406 are the estimated values of $G_y$ for the specified representative orientation angles.

The comparator component 408 is configured to compare each of the estimated $G_y$ values output by the $G_y$ estimation component 406 to the actual $G_y$ value output by the gradient computation component 400 and output a 0 or 1 bit for each estimated $G_y$ value, indicating whether the actual $G_y$ value is greater than the estimated $G_y$ value.

The bin determination component 410 includes functionality to use the outputs of the comparator component 408 and the sign bits from the gradient computation component 400 to determine a bin id for the pixel in 360 degrees. In some examples, the bin determination component 410 uses a lookup table such as that of Table 2 to determine a bin id in the first quadrant. Table 2 assumes that an output of 1 by the comparator component indicates that the actual value of $G_y$ is greater than the corresponding estimated $G_y$ value. The position of the last 0 in a row of the table determines the bin id. If all the outputs are 1, then the actual $G_y$ is greater than all the estimated $G_y$ values and the bin id is 1.

The bin determination component 410 then uses the sign bits to determine the actual quadrant as per Table 1 and, if the actual quadrant is not the first quadrant, the bin determination quadrant 410 determines the bin id in the actual quadrant. Because tangent is a symmetric function, there are symmetric bins in each of the other three quadrants for each bin in the first quadrant. For example, if the bin id in the first quadrant is n, the symmetric bin id in the other quadrants is a deterministic function of n. The output of the bin determination component 402 is the bin id for the pixel. By using the sign bits generated in 400 along with the output of comparator 408 in just one quadrant between 0 to 90 degrees, the bin determination 410 can accurately identify the actual pixel bin in the full 360 degree space.

TABLE 2

| <> | $G_x*\tan(\theta_1)$ | $G_x*\tan(\theta_2)$ | ... | $G_x*\tan(\theta_n)$ | Bin ID |
|---|---|---|---|---|---|
| Gy | 1 | 1 | 1 | 1 | 1 |
|  | 0 | 1 | 1 | 1 | 2 |
|  | . | . | . | . | . |
|  | . | . | . | . | . |
|  | . | . | . | . | . |
|  | 0 | 0 | 0 | 0 | n |

The magnitude component 404 receives the bin id from the bin identification component 402 and the gradient $G_x$ and the sign bits from the gradient computation component 400 and uses these inputs to determine the magnitude of the gradients of the pixel. To determine the magnitude for a pixel, the magnitude component 404 computes the magnitude for each of the specified representative orientation angles and uses the sign bits and the bin id to select the computed magnitude corresponding to the orientation angle used in determining the bin id.

The magnitude component 404 includes a magnitude computation component 412, a magnitude selector component 416, and a multiplexer 414. The magnitude computation component 412 is configured to compute magnitudes corresponding to multiple representative orientation angles. That is, the magnitude computation component 412 is configured to compute $$G_{mag}=G_x*\sec(\theta)$$

using each specified representative orientation angle. The computations are performed in parallel and the representative orientation angles are the same as those used by the $G_y$ estimation component 406. The outputs of the magnitude computation component are the computed magnitudes corresponding to the specified representative orientation angles.

The multiplexer 414 is configured to select one of the outputs of the magnitude computation component 412 as the magnitude for the pixel using a selector determined by the magnitude selector component 416.

The magnitude selector component 416 is configured to determine a selector value for the multiplexer 414 using the bin id from the bin identification component 402 and the sign bits of the gradients from the gradient computation component 400. Because the bin id can be in any of the four quadrants while the representative orientation angles are confined to a single quadrant, the bin id can be larger than the number of outputs of the magnitude computation component 412. The magnitude selector component 416 includes functionality to quantize the bin id according to the symmetric tangent graph, i.e., so that multiple values of the bin id map to a single selector value. As many as four bin id values can map to the same selector. The magnitude selector component 416 uses the sign bits together with the number of bins in a quadrant to perform this mapping.

For example, if the HOG accelerator 312 is configured for a 40 bin histogram, there are 10 bins per quadrant. Assume that the bin determination component 410 determin3s that the bin id for a pixel is 12, which falls in the second quadrant. The magnitude $G_{mag}$ for this bin id is the same as the magnitude for bin ids 2, 22, and 32. To ensure that $G_{mag}$ is resolved correctly, the magnitude selector component 416 maps bin ids 2, 12, 22, and 32 to the same selector value.

The HOG accelerator 312 further includes memory mapped registers (not specifically shown) used to store various control and configuration parameters that are set by the vision processing application. Parameters include representative orientation angle values and the number of bins in the first quadrant. The vision processing application specifies one representative orientation angle value for each bin.

As previously mentioned, the $G_y$ estimation component 406 computes $$G_y=G_x*\tan(\theta)$$

for each representative orientation angle and the magnitude computation component 412 computes $$G_{mag}=G_x*\sec(\theta)$$

for each representative orientation. Any suitable technique can be used in these components to compute $G_x*\tan(\theta)$ and $G_x*\sec(\theta)$. For example, the computations may be based on lookup tables for $\tan(\theta)$ and $\sec(\theta)$.

In some examples, the computations are implemented based on the coordinate rotation digital computer (CORDIC) algorithm. CORDIC uses simple shift-add operations for calculating trigonometric functions such as tangent and secant. That is, $\tan(\theta)$ and $\sec(\theta)$ can be represented as $^i\Sigma(-1)^m X(2)^{-i} \rightarrow$ CORDIC implementation where i is an integer between −8 to +8 and m is either 1 or 2. For example, in a CORDIC implementation, $G_x*\tan(20) \sim G_x*0.36$ can be calculated as $G_x*(0.25+0.125-0.015625) \rightarrow$ shift $G_x$ left by 2+shift $G_x$ left by 4−shift $G_x$ left by 6 and $G_x*\sec(20) \sim G_x*1.00625$ can be calculated as $G_x*\sec(20) \rightarrow G_x$+shift $G_x$ right by 4. In some such examples, rather than implementing a full CORDIC engine, a CORDIC engine of limited scope is implemented where the limited scope is determined by the maximum number of bins/orientation angles the accelerator is designed to support. For example, a limited scope CORDIC engine can be implemented to support calculations for a maximum of thirty-two bins/orientation angles.

Figure 5:
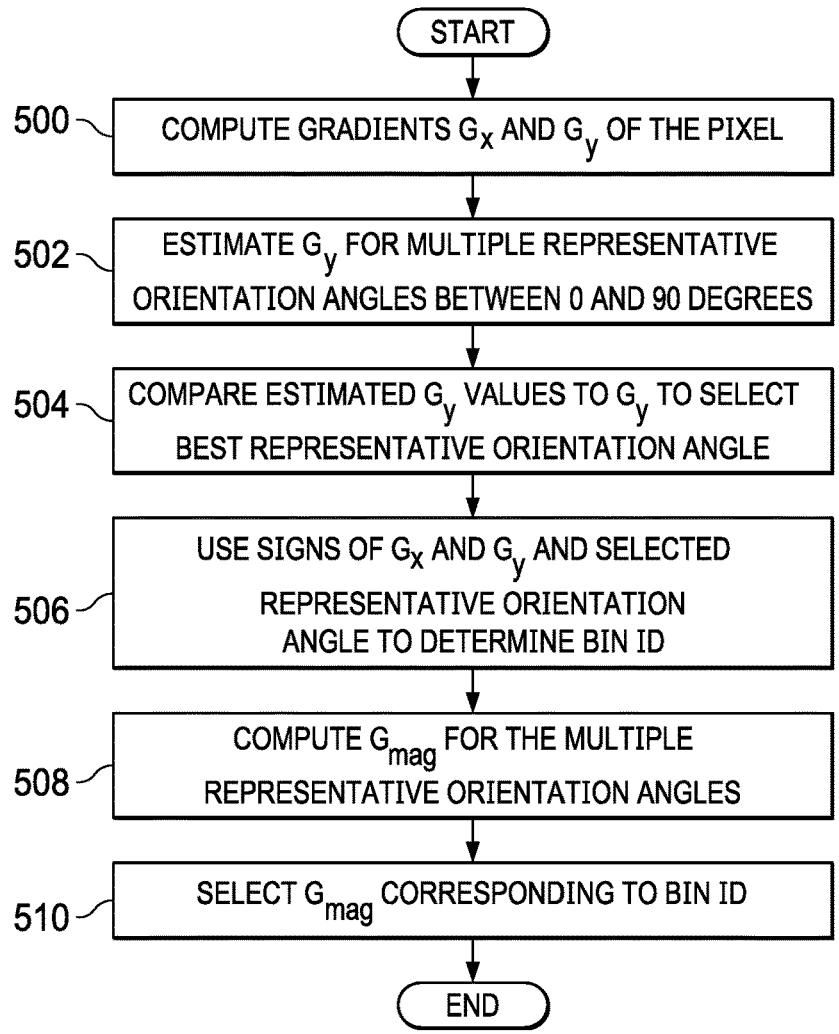
FIG. 5 is a flow diagram of a method for determining a bin id and a magnitude for a pixel.

FIG. 5 is a flow diagram of a method for determining a bin id and a magnitude for a pixel that can be performed by a hardware accelerator such as the HOG accelerator 312. Initially, the gradients $G_x$ and $G_y$ of the pixel are computed 500. Any suitable algorithm can be sued to compute the gradients.

Values of $G_y$ are then estimated 502 for multiple representative orientation angles between 0 and 90 degrees. The number and values of the representative orientation angles is determined by a vision processing application and the maximum number is set by the hardware design. The estimated values of $G_y$ are computed as per $$G_y=G_x*\tan(\theta)$$

for each representative orientation angle.

The estimated $G_y$ values are compared 504 to the actual Gy value to select the best representative orientation angle for the pixel. As previously described herein, the selection process can be implemented using a look up table. The signs of the gradients and the selected representative orientation angle are used 506 to determine the bin id for the pixel. As previously mentioned, the signs of the gradients are used to determine the actual quadrant of the orientation angle.

The magnitude $G_{mag}$ corresponding to each of the representative orientation angles is also computed 508 as per $$G_{mag}=G_x*\sec(\theta)$$

and the bin id and gradient sign bits are used to select 510 the computed magnitude corresponding to the representative orientation angle used to determine the bin id.

Figure 6:
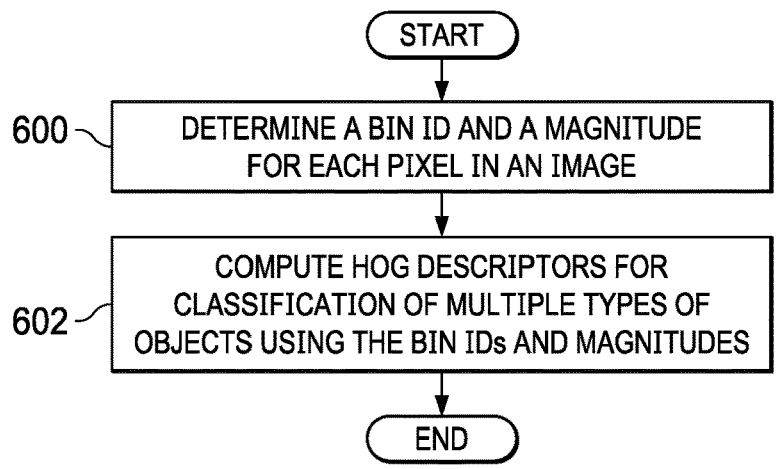
FIG. 6 is a flow diagram of a method for generating HOG descriptors.

FIG. 6 is a flow diagram of a method for generating HOG descriptors of an image that can be performed by the SOC 300 of FIG. 3. Initially, a bin id and a magnitude for each pixel in an image captured by the camera 324 is determined 600 by the HOG accelerator 312. A vision processing application executing on the DSP 304 configures the HOG accelerator 312 to determine the bin ids and magnitudes for the image pixels and store the data in the RAM 318. The vision processing application configures the HOG accelerator 312 to use representative orientation angles values and a number of bins according to the particular types of objects the vision processing application is programmed to detect.

HOG descriptors are then computed 602 by the HOG generator 314 for use in classification of multiple types of objects using the bin ids and magnitudes. That is, for each type of object the vision processing application is programmed to detect, the vision processing application configures the HOG generator 314 to generate HOG descriptors for detection windows, cell, and block sizes suitable for each object type using the bin ids and magnitudes stored in the RAM 318. For example, if the vision processing application is programmed to detect pedestrians, vehicles, and street signs, the application programs the HOG generator 314 to generate HOG descriptors for detecting pedestrians. When that task is complete, the application programs the HOG generator 314 to generate HOG descriptors for vehicles. When that task is complete, the application programs the HOG generator 314 to generate HOG descriptors for street signs. The HOG generator 314 reuses the bin ids and magnitudes stored in the RAM 318 for each of these HOG descriptor generation tasks.

OTHER EXAMPLES

While the disclosure has been described with respect to a limited number of examples, those having benefit of this disclosure will appreciate that other examples can be devised which do not depart from the scope of the disclosure as described herein.

In some examples described herein, the bin determination component 410 uses a lookup table such as that of Table 2 to determine a bin id in the first quadrant and then applies the signs to determine the actual quadrant and the true bin id. In other examples, the signs are included in the table.

Examples of a HOG accelerator are described herein in which the accelerator operates on a pixel at a time. In other examples, additional functionality is included in the HOG accelerator to operate on multiple pixels in parallel.

In some examples, the HOG generator is not included in the SOC and the functionality of the HOG generator, i.e., generation of HOG descriptors using the output of the HOG accelerator, is performed by an application executing on one of the processors of the SOC.

In some examples described herein, a bin id that can be in any quadrant is quantized by a magnitude selector component to generate a selector for the magnitude. In other examples, the original bin id generated for the first quadrant is used to select the magnitude and the magnitude selector component is not present.

In some examples, the HOG generator and the HOG accelerator are combined in a single accelerator.

Examples of a configurable HOG accelerator are described herein. In other examples, the HOG accelerator has predetermined angle values and a predetermined number of bins.

In some examples, a ping pong buffer in the RAM is used to store the outputs of the HOG accelerator, thus allowing the HOG generator to use the data for one image in one buffer while the HOG accelerator is generating bin ids and magnitudes for another image and storing the data in the other buffer.

It is therefore contemplated that the appended claims will cover any such modifications of the examples as fall within the true scope of the disclosure.

What is claimed is:

1. A device comprising:
a gradient component configured to determine, for a pixel, a first gradient value and a second gradient value;
an estimation component coupled to the gradient component and configured to:
receive the first gradient value; and
for each angle of a set of angles, determine a respective value by multiplying the first gradient value by a tangent of the respective angle;
a comparator coupled to the gradient component and the estimation component and configured to:
receive the second gradient value;
receive the respective values of the set of angles; and
for each of the respective values of the set of angles, compare the respective value to the second gradient value to produce a respective comparison of a set of comparisons;
a bin identification component coupled to the comparator and configured to:
receive the set of comparisons; and
determine a histogram bin for the pixel based on the set of comparisons;
a magnitude component having an input coupled to the gradient component and configured to:
receive the first gradient value at the input of the magnitude component; and
for each angle of the set of angles, determine a respective magnitude value by multiplying the first gradient value by a ratio of lengths of line segments of a right triangle forming the respective angle;
a magnitude selector having first and second inputs respectively coupled to the gradient component and to the bin identification component, the magnitude selector configured to receive at the first input of the magnitude selector an identifier of the histogram bin; and
a multiplexer having first and second inputs respectively coupled to the magnitude component and to the magnitude selector, the multiplexer configured to receive at the first input of the multiplexer the respective magnitude values of the set of angles;
wherein the magnitude selector is further configured to cause the multiplexer to output a first magnitude of the respective magnitude values of the set of angles based on the identifier of the histogram bin.

2. The device of claim 1, wherein:
the gradient component is further configured to determine a first sign bit of the first gradient value and a second sign bit of the second gradient value; and
the bin identification component is further configured to:
receive the first sign bit and the second sign bit; and
determine the histogram bin associated with the pixel based on the first sign bit and the second sign bit.

3. The device of claim 2, wherein the bin identification component is further configured to:
determine a quadrant associated with the pixel based on the first sign bit and the second sign bit; and
determine the histogram bin for the pixel based on the set of comparisons and further based on the quadrant.

4. The device of claim 1, wherein
the ratio of lengths of line segments of a right triangle forming the respective angle is a secant of the respective angle;
the multiplexer is configured to receive, at the second input of the multiplexer, a selector value from the magnitude selector; and
the magnitude selector is configured to receive, at the second input of the magnitude selector, sign bits from the gradient component.

5. The device of claim 4, further comprising a histogram of gradients generator coupled to the bin identification component and to the multiplexer and configured to determine a histogram of gradients based on the identifier of the histogram bin and the first magnitude.

6. The device of claim 4, wherein:
the gradient component is further configured to determine a first sign bit of the first gradient value and a second sign bit of the second gradient value, the first sign bit and the second sign bit being at least a subset of the sign bits; and
the magnitude selector is further configured to:
receive, at the second input of the magnitude selector, the first sign bit and the second sign bit; and
cause the multiplexer to provide the first magnitude based on the first sign bit and the second sign bit.

7. The device of claim 1, wherein the estimation component includes a coordinate rotation digital computer (CORDIC) engine configured to determine, for each angle of the set of angles, the tangent of the respective angle.

8. The device of claim 1, wherein:
the bin identification component includes a memory configured to store a lookup table; and
the bin identification component is configured to determine the histogram bin by querying the lookup table based on the set of comparisons.

9. The device of claim 1, wherein each angle of the set of angles is within a quadrant.

10. The device of claim 1, wherein each angle of the set of angles is between 0° and 90°.

11. The device of claim 1, wherein the estimation component is configured to determine the respective values for the set of angles in parallel.

12. A device comprising:
a gradient component configured to determine, for a pixel, a first gradient value;
a magnitude component coupled to the gradient component and configured to:
receive the first gradient value; and
for each angle of a set of angles, determine a respective magnitude value by multiplying the first gradient value by a secant of the respective angle;
a multiplexer coupled to the magnitude component and configured to receive the respective magnitude values of the set of angles; and
a magnitude selector coupled the multiplexer and configured to:
receive an identifier of a histogram bin for the pixel; and
cause the multiplexer to provide a first magnitude of the respective magnitude values of the set of angles based on the identifier of the histogram bin.

13. The device of claim 12, wherein:
the gradient component is further configured to determine:
a first sign bit of the first gradient value;
a second gradient value; and
a second sign bit of the second gradient value; and
the magnitude selector is further configured to:
receive the first sign bit and the second sign bit; and
cause the multiplexer to provide the first magnitude based on the first sign bit and the second sign bit.

14. The device of claim 12, wherein:
the gradient component is further configured to determine a second gradient value; and
the device further comprises:
an estimation component coupled to the gradient component and configured to:
receive the first gradient value; and
for each angle of the set of angles, determine a respective value by multiplying the first gradient value by a tangent of the respective angle;
a comparator coupled to the gradient component and the estimation component and configured to:
receive the second gradient value;
receive the respective values of the set of angles; and
for each of the respective values of the set of angles, compare the respective value to the second gradient value to produce a respective comparison of a set of comparisons; and
a bin identification component coupled to the comparator and configured to:
receive the set of comparisons;
determine the histogram bin for the pixel based on the set of comparisons; and
provide the identifier of the histogram bin to the magnitude selector.

15. The device of claim 14, wherein:
the gradient component is further configured to determine a first sign bit of the first gradient value and a second sign bit of the second gradient value; and
the bin identification component is further configured to:
receive the first sign bit and the second sign bit; and
determine the histogram bin for the pixel based on the first sign bit and the second sign bit.

16. The device of claim 15, wherein the bin identification component is further configured to:
determine a quadrant associated with the pixel based on the first sign bit and the second sign bit; and
determine the histogram bin for the pixel based on the set of comparisons and further based on the quadrant.

17. The device of claim 12, wherein the magnitude component includes a coordinate rotation digital computer (CORDIC) engine configured to determine, for each angle of the set of angles, the secant of the respective angle.

18. The device of claim 12, wherein each angle of the set of angles is within a quadrant.

19. The device of claim 12, wherein each angle of the set of angles is between 0° and 90°.

20. The device of claim 12, wherein the magnitude component is configured to determine the respective magnitude values for the set of angles in parallel.

* * * * *